United States Patent [19]

Brazdil, Jr. et al.

[11] Patent Number: 5,432,141

[45] Date of Patent: Jul. 11, 1995

[54] PREPARATION OF ATTRITION RESISTANT VANADIUM-ANTIMONY OXIDE CATALYSTS

[75] Inventors: James F. Brazdil, Jr.; Joseph P. Bartek, both of Highland Heights, Ohio

[73] Assignee: The Standard Oil Company, Cleveland, Ohio

[21] Appl. No.: 213,325

[22] Filed: Mar. 15, 1994

[51] Int. Cl.6 .................................................. B01J 23/00
[52] U.S. Cl. ................................. 502/311; 502/312; 502/344
[58] Field of Search ......................... 502/311, 312, 344

[56] References Cited

U.S. PATENT DOCUMENTS

| | | | |
|---|---|---|---|
| 4,508,848 | 4/1985 | Dolhyj et al. | 502/239 |
| 4,668,653 | 5/1987 | Teller et al. | 502/215 |
| 4,746,641 | 5/1988 | Guttmann et al. | 502/202 |
| 4,879,264 | 11/1989 | Toft et al. | 502/8 |
| 5,008,427 | 4/1991 | Brazdil et al. | 558/319 |
| 5,094,989 | 5/1992 | Lynch et al. | 502/202 |
| 5,214,016 | 5/1993 | Brazdil et al. | 502/202 |

*Primary Examiner*—Michael Lusignan
*Attorney, Agent, or Firm*—Michael F. Esposito; David P. Yusko; David J. Untener

[57] ABSTRACT

This invention relates to a process for preparing an attrition resistant vanadium-antimony oxide catalyst by adding to a vanadium-antimony oxide catalyst slurry a lithium compound which upon contact with the aqueous catalyst slurry provides hydroxide, such as lithium hydroxide or lithium carbonate. The process comprises the steps of preparing a catalyst slurry comprising vanadium oxide and antimony oxide, adding the lithium compound to the catalyst slurry, concentrating the catalyst slurry to increase the solids content of the slurry, and drying the catalyst slurry to form attrition resistant particles of catalyst.

23 Claims, No Drawings

PREPARATION OF ATTRITION RESISTANT VANADIUM-ANTIMONY OXIDE CATALYSTS

BACKGROUND OF THE INVENTION

1. Field of the Invention

This invention, relates to a process for preparing an attrition resistant vanadium-antimony oxide catalyst by adding to a vanadium-antimony oxide catalyst slurry a lithium compound which upon contact with the aqueous catalyst slurry provides hydroxide ions, such as lithium hydroxide or lithium carbonate. More particularly, this invention relates to a process for preparing an attrition resistant vanadium-antimony oxide catalyst involving preparing a catalyst slurry containing vanadium oxide and antimony oxide and other elements, adding lithium in the hydroxide form to the catalyst slurry, concentrating the catalyst slurry to increase the solids content of the catalyst slurry, and drying the catalyst slurry to form attrition resistant particles of vanadium-antimony catalyst.

The attrition resistant vanadium-antimony oxide catalyst of the present invention may be used in any oxidation or ammoxidation reactor. Catalysts made according to this invention are preferably used in fluid bed or transport line reactors, requiring hard, microspheroidal catalysts. These fluid bed or transport line reactors include variants with catalyst fluidized or conveyed by fast vapor streams, such as spouted beds. Ammoxidation reactors where part of the oxygen is supplied to the catalyst in an external regenerator are also well adapted to the use of such vanadium-antimony oxide catalysts.

The catalyst of the present invention is useful for the oxidation and ammoxidation of paraffins, olefins, and alkylaromatic compounds in a reaction zone. In particular, the ammoxidation of propane or propylene with ammonia and oxygen to make acrylonitrile, the ammoxidation of methylpyridine with ammonia and oxygen to make the corresponding cyanopyridine, the ammoxidation of m-xylene with ammonia and oxygen to make isophthalonitrile and the oxidation of o-xylene to make phthalic anhydride.

2. Description of the Prior Art

U.S. Pat. No. 4,879,264, discloses a process for making vanadium and antimony oxide catalysts which can contain lithium. Further, U.S. Pat. 5,008,427, discloses a process for preparing vanadium-antimony oxide catalysts for propane and isobutane ammoxidation in which lithium can be added to the catalyst as lithium nitrate. Neither patent discloses a process for preparing a vanadium-antimony oxide catalyst by adding a lithium compound which upon contact with the aqueous catalyst slurry provides hydroxide to the catalyst slurry. In particular, neither of these patents discloses adding lithium hydroxide or lithium carbonate to the catalyst slurry. These patents do not suggest that the attrition resistance of vanadium-antimony oxide catalysts is improved by adding at least part of lithium in a form which provides hydroxide ions to the catalyst slurry. It has been discovered that these vanadium-antimony oxide catalysts which do provide lithium at least in part by adding the lithium in a form which provides hydroxide ions upon contact with the catalyst slurry have high attrition resistance.

It is desirable to have a process for preparing vanadium-antimony oxide catalysts which have improved attrition resistance.

SUMMARY OF THE INVENTION

It is an object of the present invention to provide a process for preparing a vanadium-antimony oxide catalyst which has improved attrition resistance.

It is a further object of the present invention to provide a process for preparing a vanadium-antimony oxide catalyst having improved attrition resistance by adding a lithium compound which upon contact with the aqueous catalyst slurry provides hydroxide ions to the catalyst slurry.

It is another object of the present invention to provide a vanadium-antimony oxide catalyst which contains silica and has improved attrition resistance.

It is still another object of the present invention to provide a vanadium-antimony oxide catalyst with improved attrition resistance and without significantly affecting their selectivity for ammoxidation.

These and other objects, together with the advantages over the prior art, shall become apparent from the specification which follows and accomplished by the invention as hereinafter described and claimed.

To achieve the foregoing objects in accordance with the purpose of the invention as embodied and broadly described herein, there is provided a process for preparing an attrition resistant vanadium-antimony oxide catalyst. The process comprises the steps of preparing a catalyst slurry comprising vanadium oxide and antimony oxide, adding a lithium compound which upon contact with the aqueous catalyst slurry provides hydroxide ions to the catalyst slurry, concentrating the catalyst slurry to increase the solids content of the slurry, and drying the catalyst slurry to form attrition resistant particles of catalyst. Preferably the lithium compound may be lithium hydroxide or lithium carbonate, most preferably being lithium hydroxide.

DETAILED DESCRIPTION OF THE INVENTION

This invention is directed to a process for preparing attrition resistant vanadium-antimony oxide catalysts. The process comprises preparing a catalyst slurry comprising vanadium oxide and antimony oxide, adding a lithium compound which upon contact with aqueous catalyst slurry provides hydroxide ions to the catalyst slurry, concentrating the catalyst slurry to increase the solids content of the slurry, and drying the catalyst slurry to form attrition resistant particles of catalyst.

The attrition resistant vanadium-antimony oxide catalyst of the present invention is prepared with the elements and proportions indicated by the empirical formula:

$$VSb_mLi_nA_aD_dO_x$$

where Li is added as a lithium compound which upon contact with aqueous catalyst slurry provides hydroxide ions to the catalyst slurry; A is selected from the group consisting of titanium, tin, and combinations thereof; D is selected from the group consisting of magnesium, calcium, strontium, barium, cobalt, nickel, zinc, germanium, niobium, zirconium, molybdenum, tungsten, copper, tellurium, tantalum, selenium, bismuth, cerium, indium, arsenic, boron, manganese, sodium, iron, chromium, gallium, phosphorus, and combinations thereof; m is 0.5 to 10; n is 0.005 to 0.15 or the amount of lithium hydroxide added is 0.1 to 3 micromoles per square meter of vanadium and antimony oxide particles in the catalyst slurry; a is 0 to 10; d is 0 to 10; and x is determined by the oxidation state of the cations present.

The attrition resistant vanadium-antimony oxide catalysts are made by adding a lithium compound which upon contact with the aqueous catalyst slurry provides hydroxide to a vanadium-antimony oxide slurry. Preferably, the lithium is added as lithium hydroxide. Any method known in the art may be used to make the vanadium-antimony slurry. The lithium hydroxide may be added with or without lithium salts.

In a preferred embodiment, the catalysts are made by adding lithium hydroxide to a preformed vanadium-antimony oxide sol. The sol is made according to the peroxide method as described in U.S. Pat. No. 4,784,879 and U.S. Pat. No. 4,879,264, herein incorporated by reference. Preparing the preformed vanadium-antimony oxide sol by the peroxide method comprises reacting hydrogen peroxide in aqueous solution with a vanadium compound to form a monoperoxovanadium ion and reacting this monoperoxovanadium ion so formed with antimony trioxide to form a sol. The catalyst may contain vanadium and antimony oxides in other forms, however. Preferably, the catalyst slurry contains excess antimony oxide in various oxidation states. All or any fraction of lithium hydroxide may be added before the sol is formed and still retain the benefits of adding lithium in the hydroxide form. The elements of groups A and D may be added before or after the lithium hydroxide.

The amount of lithium added is chosen according to the hydroxide adsorption capacity of the vanadium-antimony oxide slurry. For catalysts made by reacting all the vanadium oxide with antimony oxide by the peroxide method as described above, the lithium content of the catalysts is 0.005 to 0.15 relative to the vanadium content of the catalyst. For vanadium-antimony oxide slurries with different average particle size than those made completely by the peroxide method, the amount of lithium hydroxide added is 0.1 to 3 micromoles per square meter of vanadium-antimony oxide slurry particles.

The addition of lithium hydroxide allows the catalyst slurry to be concentrated to have sufficiently high solids content to form attrition resistant particles of catalyst. Other methods may be used for concentrating the catalyst slurry, such as contacting droplets of various sizes with hot oil or spinning a stream of the slurry into fibers, especially if catalysts usable in fixed bed reactors are desirable.

Once the lithium hydroxide is added to the catalyst slurry, it decreases the slurry viscosity. Upon the addition of lithium hydroxide, the slurry viscosity of the catalyst having solids content from 30–40% is reduced to 100–10,000 centipoise and can be easily pumped to a spray nozzle or atomizer wheel where it is formed into droplets. Since the droplets are concentrated and have high solids contents, they dry to form hard, attrition resistant microspheres.

The catalyst slurry can also be dried by heating to at least 110° C. in an oven to form attrition resistant particles of catalyst.

These catalysts have been heated at a calcination temperature of at least 780° C. The calcination temperatures can be as high as 1200° C. but are preferably in the range of 790°–1050° C. The catalysts may be activated by the procedure of U.S. Pat. No. 5,094,989, herein incorporated by reference. In this procedure, the catalysts are activated by washing them with hydroxy compounds, preferably alcohols, after calcination.

The catalyst can be supported on any suitable carrier. Examples of such carriers are silica, alumina, silica-alumina, and the like.

In another embodiment of the invention, a particularly attrition resistant form of the catalyst contains silica, added as silica sol. Various types of silica sol, with particle sizes of 5–100 nanometers, can be used. The silica sol may be added before or after the lithium hydroxide. Part of the lithium added to the catalyst can be in the form of lithium exchanged silica sol with excess lithium hydroxide. Usually, these catalytic grade silica sols have low alkali metal content, and are stabilized by ammonia. Ion exchange with resins in acid or ammonium forms can also be used to remove excess alkali or alkaline earth ions from the silica. Other elements may be added in sol form also, with or without lithium hydroxide stabilizers.

The process of preparing vanadium-antimony oxide catalysts of the present invention significantly improves the attrition resistance of these catalysts. The process of the present invention also provides attrition resistant vanadium-antimony oxide catalyst without significantly affecting their selectivity for ammoxidation to make them commercially useful.

EXAMPLES

Methods used to prepare representative catalysts with lithium hydroxide added and comparative catalysts are listed below. The examples are illustrative only and are not considered to be in any way limiting to the methods used to make these catalysts. The catalysts were prepared by the method of U.S. Pat. No. 4,784,979 and activated by the method of U.S. Pat. No. 5,094,989.

COMPARATIVE EXAMPLE A

Fixed Bed Version 26.93 g of vanadium pentoxide was added to a mixture of 900 g water with 100 g 30% hydrogen peroxide solution in water in a two liter beaker. After about 20 minutes, 60.63 g antimony trioxide powder was added. The beaker was covered with a watch glass and the mixture was stirred and heated for about 3 hours. During this time the slurry gradually turned blackish-grey. 84.20 g of 10.7% tin dioxide sol (Batch No. TX7684, Nalco Chemical Co.) and 2.48 g titanium dioxide powder were added to the slurry. The mixture was stirred in an uncovered beaker for about 3 hours with occasional water rinses, but no other components were added. By then, the volume of the slurry was reduced to 800 ml by evaporation of water and the solids content reached 12.8% weight. The viscosity was measured by the Brookfield method and found to be 26 cps (Spindle No. 2, 20 rpm). After about 3 more hours evaporation, the volume of the slurry was reduced to 490 ml and the solids content reached 20.6% weight. Viscosity by Brookfield reached 1000 cps (Spindle No. 4, 20 rpm), but the slurry could still be stirred. Stirring was stopped, and the slurry was dried in an oven for 40 hours at 110° C. After crushing to 6–35 mesh, it was calcined for 8 hours at 650° C., cooled, and then further crushed and sieved to 20–35 mesh. The catalyst was activated by calcining for 3 hours at 810° C. After cooling, a portion was washed with isobutanol. The total amount of isobutanol used was 18.75 ml per gram of catalyst. The isobutanol was divided into 6 portions and passed through the catalyst in a coarse frit funnel without suction.

EXAMPLE 1

$V_1Sb_{1.4}Sn_{0.2}Ti_{0.1}Li_{0.1}O_x$

Fixed Bed Version 26.93 g of vanadium pentoxide powder was added to a mixture of 900 g water with 100 g 30% hydrogen peroxide solution in water in a two liter beaker. After about 20 minutes, 60.62 g antimony trioxide powder was added. The beaker was covered with a watch glass and the mixture was stirred and heated for about 2.5 hours. During this time the slurry gradually turned blackish-grey. 84.26 g of 10.7% tin dioxide sol (Batch No. TX7684, Nalco Chemical Co.) and 2.47 g titanium dioxide powder were added to the slurry. After stirring for about 1 more hour in an uncovered beaker, 59.22 g 0.50 Molar lithium hydroxide solution mixed with 40 g more water was added. In about 5 more hours the volume of the slurry was reduced to 460 ml by evaporation of welter and the solids content reached 20.8% weight. The viscosity was measured by the Brookfield method and found to be 30 cps (Spindle No. 2, 20 rpm), much lower than for Comparative Example A without lithium hydroxide when concentrated to the same extent. After about 5 more hours evaporation, the volume of the slurry was reduced to 270 ml and the solids content reached 32.8% weight. Viscosity by Brookfield reached 1900 cps (Spindle No. 4, 20 rpm), but the slurry could still be stirred. Slurry viscosity as a function of solids content was plotted and interpolated values of solids content at selected viscosities are listed in Table 2. Stirring was stopped, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as the catalyst in Comparative Example A.

EXAMPLE 2

$V_1Sb_{1.4}Sn_{0.2}Ti_{0.1}Li_{0.1}O_x$

Fixed Bed Version 26.93 g of vanadium pentoxide powder was added to a mixture of 900 g water with 100 g 30% hydrogen peroxide solution in water in a two liter beaker. After about 20 minutes, 60.62 g antimony trioxide powder was added. Then 2.49 g titanium dioxide powder (Degussa P-25 grade) was added. The beaker was covered with a watch glass and the mixture was stirred and heated for about 2.5 hours. During this time the slurry gradually turned blackish-grey. 84.26 g of 10.7% tin dioxide sol (Batch No. TX7684, Nalco Chemical Co.) was added to the slurry. After stirring for about 1 more hour in an uncovered beaker, 82 g 0.36 Molar lithium hydroxide solution was added. In about 5 more hours of the volume of the slurry was reduced to 410 ml by evaporation of water and the solids content reached 22.9% weight. The viscosity was measured by the Brookfield method and found to be 40 cps (Spindle No. 2, 20 rpm), much lower than for Comparative Example A without lithium hydroxide when concentrated to the same extent. After about 4 more hours evaporation the volume of the slurry was reduced to 270 ml and the solids content reached 35.9% weight. Viscosity by Brookfield reached 3200 cps (Spindle No. 4, 20 rpm), but the slurry could still be stirred. Slurry viscosity as a function of solids content was plotted and interpolated values of solids contents at selected viscosities are listed in Table 2. Stirring was stopped once solids content reached 38.3% weight, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as the catalyst in Comparative Example A.

COMPARATIVE EXAMPLE B $V_1Sb_{1.4}Sn_{0.2}Ti_{0.1}O_x$

Fixed Bed Version

The catalyst was prepared by the same method as Example 2, using Degussa P-25 titanium dioxide as the source of titanium, but with no lithium hydroxide added. The catalyst was used as an exemplar of high selectivity to acrylonitrile for propane ammoxidation near 30% propane conversion in Table 4.

EXAMPLE 3

$V_1Sb_{1.4}Sn_{0.2}Ti_{0.1}Li_{0.1}O_x$

Fluid Bed Version

The catalyst slurry was prepared similarly to Example 1 but in a 25 gallon reactor to make enough for spray drying. 1876 g of vanadium pentoxide powder (Stratcor) was added to a mixture of 64 kg water with 7 kg 35% hydrogen peroxide solution (Seeler) in water in a 25 gallon reactor. After about 20 minutes, 4188 g antimony trioxide powder was added. The reactor was closed and reflux condenser cooling started. The mixture was stirred and heated for about 3.5 hours. During this time the slurry gradually turned blackish-grey. 5781 g of 10.7% tin dioxide sol (Batch No. TX7684, Nalco Chemical Co.), followed by 164 g titanium dioxide powder, were added to the slurry. After stirring for 20 minutes with the reactor open, 1016 g 2.03 Molar lithium hydroxide solution was added. In about 4 more hours, slurry viscosity was very low (20 cps), and a sample had 20.8% solids content by weight after drying. In 1 more hour the solids content reached 37.7% weight, after 61.4 kg total water was removed by evaporation. The viscosity was measured by the Brookfield method and found to be 1500 cps (Spindle No. 4, 20 rpm). The reactor was emptied into a bucket, so the slurry could be transferred to a spray drier The slurry was sampled after it cooled and viscosity was 2500 cps (Spindle No. 4, 20 rpm). Solids content, with rinsings, was 36.4% weight. The slurry was dried in a Bowen spray dryer to give 5 kg microspheroidal powder. The yield of chamber product (140 mesh to pan) which is normally used in fluid bed reactors was 2.8 kg. A portion of the 140–230 mesh fraction was calcined for 8 hours at 650° C. in a tray in a muffle furnace, and then further activated by calcining for 3 hours at 810° C., then submitted to attrition testing. Catalyst losses by attrition in the Air-Jet test were 12.9% in the 0–5 hour period and 27.9% in the 5–20 hour period.

EXAMPLE 3A $V_1Sb_{1.4}Sn_{0.2}Ti_{0.1}Li_{0.1}O_x$

Fixed Bed Version

Samples of the catalyst slurry from Example 3 taken just before spray drying were dried in beakers in a 110° C. oven, and crushed and calcined similarly to Example 1. Part of the calcined 20-35 mesh materials were washed with isobutanol the same as in Comparative Example A and tested for propane ammoxidation performance.

COMPARATIVE EXAMPLE C $V_1Sb_{1.4}Sn_{0.2}Ti_{0.1}Li_{0.1}O_x$

Fluid Bed Version

The catalyst slurry was prepared in the same 25 gallon reactor used to make the slurry for Example 3. The same procedure was used to make the slurry, except no lithium hydroxide solution was added after the titanium dioxide powder. Another batch of tin dioxide sol (Nalco LT1178, 18.2% tin dioxide, 3399 g) was used. When the slurry was concentrated to 22.8% solids content by weight of dried sample, its viscosity by Brookfield was 2400 cps (Spindle No. 4, 20 rpm), much higher than for the slurry of Examples 1, 2, and 3 at similar solids content. The slurry was spray dried and calcined as for Example 3 and submitted for attrition testing. Catalysts losses by attrition in the Air-Jet test were 52% in the 0-5 hour period and 41% in the 5-20 hour period, much higher than for Example 3.

COMPARATIVE EXAMPLE D $V_1Sb_{1.4}Sn_{0.2}Ti_{0.1}O_x$

Fluid Bed Version

The catalyst slurry was prepared in the same 25 gallon reactor used to make the slurry for Example 3. The same procedure and materials were used to make the slurry, except no lithium hydroxide solution was added after the titanium dioxide powder. The same batch of tin dioxide sol (Nalco TX7684) was used. When the slurry was concentrated to 17% solids content by weight after drying, its viscosity by Brookfield was 144 cps (Spindle No. 2, 20 rpm). The slurry was spray dried and calcined as for Example 3 and submitted for attrition testing, Catalysts losses by attrition in the Air-Jet test were 25.1% in the 0-5 hour period and 41% in the 5-20 hour period, much higher than for Example 3.

COMPARATIVE EXAMPLE D1

$V_1Sb_{1.4}Sn_{0.2}Ti_{0.1}O_x$

Fixed Bed Version

A portion of the slurry prepared in Comparative Example D was oven dried, calcined, and washed as in Example 3a to make a sample test for propane ammoxidation performance.

COMPARATIVE EXAMPLE E $V_1Sb_{1.4}Sn_{0.2}Ti_{0.1}O_x$

Fixed Bed Version

A portion of a slurry prepared similarly to Comparative Example D, but using the Degussa P-25 titanium dioxide powder (164 g) added just after the antimony oxide as in Example 2, was oven dried, calcined, and washed as in Example 3a to make a sample to test for propane ammoxidation performance.

EXAMPLE 4

$V_1Sb_{1.4}Sn_{0.2}Ti_{0.1}Li_{0.007}O_x + Acetate_{0.0034}$

Fixed Bed Version

Add all components up to titanium dioxide the same as Comparative Example A. About 1 hour after adding the titanium dioxide, add 100 g of an aqueous solution with 0.02 Molar lithium hydroxide and 0.01 Molar acetic acid. Then continue stirring and heating to evaporate water. After about 4.5 more hours, the volume of the slurry was reduced to 500 ml by evaporation of water and the solids content reached 19.1% weight. The viscosity was measured by the Brookfield method and found to be 64 cps (Spindle No. 2, 20 rpm), much lower than for the comparative catalyst without lithium hydroxide when concentrated to the same extent. After about 1 more hour evaporation the volume of the slurry was reduced to 430 ml and the solids content reached 21.9% weight. Viscosity by Brookfield reached 1500 cps (Spindle No. 4, 20 rpm), but the slurry could still be stirred. Stirring was stopped, and the slurry was dried in an oven for 40 hours at 110° C. After crushing to 6-35 mesh, it was calcined for 8 hours at 650° C., cooled and then further crushed and sieved to 20-35 mesh. The catalyst was activated by calcining for 3 hours at 810° C. The catalyst was washed with 18.75 ml isobutanol per gram, the same as Comparative Example A.

EXAMPLE 5

$V_1Sb_{1.4}Sn_{0.2}Ti_{0.1}Li_{0.03}O_x$

Fixed Bed Version

Add all components up to titanium dioxide the same as Comparative Example A. About 1 hour after adding the titanium dioxide, add 88 g of an aqueous solution with 0.1 Molar lithium hydroxide. Then continue stirring and heating to evaporate water. After about 3 more hours, the volume of the slurry was reduced to 480 ml by evaporation of water and the solids content reached 20.1% weight. The viscosity was measured by the Brookfield method and found to be 120 cps (Spindle No. 2, 20 rpm), much lower than for Comparative Example A without lithium hydroxide when concentrated to the same extent. After 2 more hours evaporation, the volume of the slurry was reduced to 350 ml and the solids content reached 26.9% weight. Viscosity by Brookfield reached 1200 cps (Spindle No. 4, 20 rpm), but the slurry could still be stirred. After about 0.5 hour more evaporation the solids content reached 29.6% weight, and the viscosity reached 3700 cps (Spindle No. 4, 20 rpm). Stirring was stopped, and the slurry was dried in an oven for 40 hours at 110° C. After crushing to 6-35 mesh, it was calcined for 8 hours at 650° C., cooled and then further crushed and sieved to 20-35 mesh. The catalyst was activated by calcining for 3 hours at 810° C. The catalyst was washed with 18.75 ml isobutanol per gram, the same as Comparative Example A.

EXAMPLE 6

$V_1Sb_{1.4}Sn_{0.2}Ti_{0.1}Li_{0.05}O_x$

Fixed Bed Version

Add all components up to titanium dioxide the same as Comparative Example A. About 2 hours after adding that component, add 145 g of an aqueous solution with 0.1 Molar lithium hydroxide. Then continue stirring and heating to evaporate water. After about 5 more hours, the volume of the slurry was reduced to 410 ml by evaporation of water and the solids content reached 23.5% weight. The viscosity was measured by the Brookfield method and found to be 58 cps (Spindle No. 2, 20 rpm). much lower than for Comparative Example A without lithium hydroxide when concentrated to the same extent. After 2 more hours evaporation, the volume of the slurry was reduced to 330 ml and the solids content reached 28.4% by weight. Viscosity by Brookfield reached 500 cps (Spindle No. 4, 20 rpm). After 1 more hour evaporation, the solids content reached 34.1% and the viscosity reached 6400 cps (Spindle No. 4, 20 rpm). Slurry viscosity as a function of solids content was plotted and interpolated values of solids content at selected viscosities are listed in Table 2. Stirring was stopped, and the slurry was dried in an oven for 40 hours at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

EXAMPLE 7

$V_1Sb_{1.4}Sn_{0.2}Ti_{0.1}Li_{0.03}O_x$

Fluid Bed Version

The catalyst slurry was prepared similarly to Example 5, but in a 25 gallon reactor to make enough for spray drying. All components up to titanium dioxide were added as in Example 3. Immediately after, 1 liter 0.62 Molar lithium hydroxide solution was added. In about 4.5 more hours, slurry viscosity was very low (20 cps), and a sample had 20.1% solids content by weight after drying. In 1 more hour the solids content reached 28.6% weight, after 58 kg total water was removed by evaporation. The viscosity was high, and the sample gelled before viscosity could be measured. After adding 3 kg of water with stirring, viscosity dropped to 100 cps by Brookfield (Spindle No. 2, 20 rpm), and slurry solids content was 23% weight. The reactor was emptied into a bucket, so the slurry could be transferred to the spray drier. The slurry was concentrated further by heating in the bucket. Just before feeding to the drier, slurry viscosity was 3200 cps (Spindle No. 4, 20 rpm). Solids content was 27.6% weight. The slurry was dried in a Bowen spray dryer to give 3.6 kg microspheroidal powder. The yield of chamber product (140 mesh to pan) which is normally used in fluid bed reactors was 1.9 kg. A portion of the 140–230 mesh fraction was calcined for 8 hours at 650° C. in a tray in a muffle furnace, and then further activated by calcining for 3 hours at 810° C., then submitted to attrition testing. Catalyst losses by attrition in the Air-Jet test were 12.1% in the 0–5 hour period and 32.5% in the 5–20 hour period.

EXAMPLE 7A $V_1Sb_{1.4}Sn_{0.2}Ti_{0.1}Li_{0.03}O_x$

Fixed Bed Version

Samples of the catalyst slurry from Example 7, taken just before spray drying were dried in beakers in a 110° C. oven, and crushed and calcined similarly to Example 5. Part of the calcined 20–35 mesh materials were washed with isobutanol (150ml/Sg) and tested for propane ammoxidation performance.

EXAMPLE 8

$V_1Sb_{1.4}Sn_{0.2}Ti_{0.1}Li_{0.03}OX + Acetate_{0.015}$

Fixed Bed Version

Add all components up to titanium dioxide the same as Example 5. About 2.5 hours after adding the titanium dioxide, add 89g of an aqueous solution with 0.1 Molar lithium hydroxide and 0.05 Molar acetic acid. Then continue stirring and heating to evaporate water. After about 3.5 more hours, the volume of the slurry was reduced to 510 ml by evaporation of water and the solids content reached 19.2% weight. The viscosity was measured by the Brookfield method and found to be 104 cps (Spindle No. 2, 20 rpm). After about 1 more hour evaporation, the volume of the slurry was reduced to 460 ml and the solids content reached 21.1% weight. Viscosity by Brookfield reached 1180 cps (Spindle No. 4, 20 rpm), but the slurry could still be stirred. After 0.5 hour more evaporation the solids content reached 22.2% weight, and the viscosity reached 3500 cps (Spindle No. 4, 20 rpm). Stirring was stopped when solids content reached 23.1% by weight, and the slurry was dried in an oven for 40 hours at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

EXAMPLE 9

80% $V_1Sb_{1.4}Sn_{0.2}Ti_{0.1}Li_{0.1}O_x$-20%$SiO_2$ (Nalco 2327 Sol)

Fixed Bed Version 21.54 g of vanadium pentoxide powder was added to a mixture of 720 g water with 80 g 30% hydrogen peroxide solution in water in a 2 liter beaker. After about 25 minutes, 48.51 g antimony trioxide powder was added. Then, 1.98 g of titanium dioxide powder (Degussa P-25 Grade) was added to the slurry as it began turning green. The beaker was covered with a watch glass and the mixture was stirred and heated for about 2.5 hours to near boiling. During this time the slurry gradually turned blackish-grey. Next, 67.84 g of 10.7% tin dioxide sol (Batch No. TX7684, Nalco Chemical Co.) was added to the slurry. After stirring for about 2 more hours in an uncovered beaker, 129.4 g 0.185 Molar lithium hydroxide solution was added. After about 1.5 hours more stirring, the slurry solids content was 13% weight and heating was decreased for the night. The next morning heating was resumed at nearly the same solids content. Then 50.1 g silica sol (Nalco No. 2327, 40% silica dioxide, Catalytic Grade) was added with stirring, leaving viscosity low. In about 4.5 more hours the volume of the slurry was reduced to 380 ml by evaporation of water and the solids content reached 25.6% weight. The viscosity was measured by the Brookfield method and found to be 34 cps (Spindle No. 2, 20 rpm), much lower than for Comparative Example A without lithium hydroxide or silica when concentrated to the same extent. After about 5 more hours evaporation, the volume of the slurry was reduced to 270 ml and the solids content reached 34.5% weight. Viscosity by Brookfield reached 570 cps (Spindle No. 4, 20 rpm), but the slurry could still be stirred. After 1 more hour evaporation the volume of the slurry was reduced to 245 ml and the solids content reached 36.8% by weight. Viscosity by Brookfield reached 1220 cps (Spindle No. 4, 20 rpm), but the slurry could still be stirred. Slurry viscosity as a function of solids content was plotted and interpolated values of solids contents at selected viscosities are listed in Table 2. When the slurry solids content reached 42.2% weight and slurry volume reached 205 ml, stirring was stopped, and the slurry was dried in an oven for three days at 110° C. After crushing to 6-35 mesh, it was calcined for 8 hours at 650° C., cooled and then further crushed and sieved to 20-35 mesh. The catalyst was activated by calcining for 3 hours at 810° C. The catalyst was washed with 18.75 ml isobutanol per gram, the same as Comparative Example A.

EXAMPLE 10

80% $V_1Sb_{1.4}Sn_{0.2}Ti_{0.1}Li_{0.1}O_x$-20%$SiO_2$ (Nalco 2327 sol)

Fluid Bed Version

Catalyst slurry equivalent to four batches of Example 9 was prepared in three 2 liter beakers using the same ingredients and proportions, so that enough could be concentrated for drying in a portable Niro spray drier. After stirring about 2 hours more once lithium hydroxide was added, the slurry solids content was 16-17% weight and heating was decreased for the night. The next morning, heating was resumed at nearly the same solids content and all the slurry was combined in one beaker. Then 201.3 g of silica sol (Nalco No. 2327, 40% silicon dioxide, Catalytic Grade) was added with stirring, leaving viscosity low. The volume of the slurry was reduced to 1020 ml by evaporation of water and the solids content reached 33.2% weight. The viscosity was measured by the Brookfield method and found to be 700 cps (Spindle No. 2, 20 rpm). The slurry was dried in a portable Nifo spray drier to give 377 g microspheroidal powder. The yield of the chamber product (140 Mesh to pan) which is normally used in fluid bed reactors was 173 g. A portion of that fraction was calcined for 8 hours at 650° C. in a tray in a muffle furnace, and then further activated by calcining for 3 hours at 810° C., before submitting for attrition testing. Catalysts losses by attrition in the Air-Jet Attrition test were 2.4% in the 0-5 hour period and 3.9% in the 5-20 hour period.

EXAMPLE 11

80% $V_1Sb_{1.4}Sn_{0.2}Ti_{0.1}Li_{0.1}O_x$-20%$SiO_2$ (Nissan Snowtex sol)

Fluid Bed Version

The same procedure as in Example 10 was used to prepare a slurry with all ingredients except silica. At that point the slurry volume was 1110 ml, and the solids content was 25.7% weight. Then 268.2 g silica sol (Nissan Snowtex, 30% silicon dioxide) was added with stirring, with no apparent change in viscosity. The volume of slurry was reduced to 990 ml by evaporation of water and the solids content reached 34.7% weight. The viscosity was measured by the Brookfield method and found to be 680 cps (Spindle No. 4, 20 rpm). The slurry was dried in a portable Nifo spray drier to 347 g microspheroidal powder. The yield of chamber product (140 Mesh to pan) which is normally used in fluid bed reactors was 167 g. A portion of that fraction was calcined for 8 hours at 650° C. in a tray in a muffle furnace, and then further activated by calcining for 3 hours at 810° C., before submitting for attrition testing. Catalysts losses by attrition in the Air-Jet Attrition test were 2.7% in the 0-5 hour period and 7.2% in the 5-20 hour period.

COMPARATIVE EXAMPLE F

80% $V_1Sb_{1.4}Sn_{0.2}Ti_{0.1}O_x$-20%$SiO_2$ (Nissan Snowtex sol)

Fluid Bed Version

The catalyst slurry was prepared in the same 25 gallon reactor used in Example 3. 1688 g of vanadium pentoxide powder (Stratcor) was added to a mixture of 56.7 kg water with 6.3 kg 35% hydrogen peroxide solution (Seeler) in water in a 25 gallon reactor. After about 40 minutes, 3769 g antimony trioxide powder was added. The reactor was closed and reflux condenser cooling started. The mixture was stirred and heated for about 3 hours. During this time the slurry gradually turned blackish-grey. 5203 g of 10.7% tin dioxide sol (Batch No. TX7684, Nalco Chemical Co.), followed by 148 g titanium dioxide powder, were added to the slurry. Then 5128 g silica sol (Nissan Snowtex 30% silicon dioxide) was added. In about 4 more hours, slurry viscosity was 22 cps, and solids content was 21-22% by weight based on slurry weight and spray drier yield. The slurry was dried in a Bowen spray dryer to give 7.2 kg microspheroidal powder. The yield of chamber product (140 mesh to pan) which is normally used in fluid bed reactors was 4.3 kg. A portion of the 140-230 mesh fraction was calcined for 8 hours at 650° C. in a tray in a muffle furnace, and then further activated by calcining for 3 hours at 810° C., then submitted to attrition testing. Catalyst losses by attrition in the Air-Jet test were 55.2% in the 0-5 hour period and 48.5% in the 5-20 hour period.

EXAMPLE 12

90% $V_1Sb_{1.4}Sn_{0.2}Ti_{0.1}Li_{0.1}O_x$-10%$SiO_2$ (Nissan Snowtex sol)

Fluid Bed Version

The same procedure as in Example 10 was used to prepare a slurry with all ingredients except silica. The amounts of all reagents to this point were increased by 9/8 to give the same amount of finished catalyst after silica addition. The slurry volume just before silica was added was 1300 ml, and the solids content was 25.3% weight. Next 133.4 g silica sol (Nissan Snowtex, 30% silicon dioxide) was added with stirring, with no apparent change in viscosity. The volume of slurry was reduced to 1080 ml by evaporation of water and the solids content reached 31.7% weight. The viscosity was measured by the Brookfield method and found to be 750 cps (Spindle No. 4, 20 rpm). The slurry was dried in a portable Niro spray drier to 399 g microspheroidal powder. The yield of chamber product (140 Mesh to pan) which is normally used in fluid bed reactors was 178 g. A portion of that fraction was calcined for 8 hours at 650° C. in a tray in a muffle furnace, and then further activated by calcining for 3 hours at 810° C., before submitting for attrition testing. Catalysts losses by attrition in the Air-Jet Attrition test were 5.2% in the 0-5 hour period and 12.0% in the 5-20 hour period.

EXAMPLE 13

80% $V_1Sb_{1.4}Sn_{0.2}Ti_{0.1}Li_{0.1}O_x$-20%$SiO_2$ (Nalco 1060 sol)

Fluid Bed Version

The same procedure as in Example 10 was used to prepare a slurry with all ingredients except silica. The slurry solids content, after stirring overnight and further evaporation, was 20–22% in two beakers. Silica sol totaling 357 g was added to the catalyst slurry, without affecting the low viscosity. The silica sol had 22.7% silicon dioxide by weight and was prepared by treating Nalco 1060 silica sol (initially 50% silicon dioxide) with an ion exchange resin in acid form (Dowex HCR-W2) to remove sodium and adjusting pH to 9 with ammonium hydroxide. The volume of slurry was reduced to 1000 ml by evaporation of water and the solids content reached 35.2% weight. The viscosity was measured by the Brookfield method and found to be 450 cps (Spindle No. 4, 20 rpm). The slurry was dried in a portable Niro spray drier to 320 g microspheroidal powder. The yield of chamber product (140 Mesh to pan) which is normally used in fluid bed reactors was 1.78 g. A portion of that fraction was calcined for 8 hours at 650° C. in a tray in a muffle furnace, and then further activated by calcining for 3 hours at 810° C., before submitting for attrition testing. Catalysts losses by attrition in the Air-Jet Attrition test were 1.6% in the 0–5 hour period and 10.6% in the 5–20 hour period.

EXAMPLE 14

90% $V_1Sb_{1.4}Sn_{0.2}Ti_{0.1}Li_{0.1}O_x$-10%$SiO_2$ (Nalco 1060 sol)

Fixed Bed Version

The same procedure as in Example 9 was used to prepare a slurry with all ingredients except silica. The amounts of all reagents to this point were increased by 9/8 to give the same amount of finished catalyst after silica addition. The slurry volume just before silica was added was 790 ml, and the solids content was 11.4% weight. Then 44.5 g silica sol (the same ion exchanged and diluted Nalco silica sol used in Example 13) was added with stirring, leaving viscosity low. In about 7.5 more hours the volume of slurry was reduced to 290 ml by evaporation of water and the solids content reached 31.1% weight. The viscosity was measured by the Brookfield method and found to be 198 cps (Spindle No. 2, 20 rpm) much lower than for the comparative catalyst without lithium hydroxide or silica when concentrated to the same extent. After 1 more hour evaporation the volume of the slurry was reduced to 240 ml and the solids content reached 35.9% by weight. Viscosity by Brookfield reached 1320 cps (Spindle No. 4, 20 rpm), but the slurry could still be stirred. After 1.5 more hours evaporation the volume of the slurry was reduced to 220 ml and the solids content reached 39.4% by weight. Viscosity by Brookfield reached 6250 cps (Spindle No. 4, 20 rpm). Slurry viscosity as a function of solids content was plotted and interpolated values of solids contents at selected viscosities are listed in Table 2. Then stirring was stopped, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

EXAMPLE 15

80% $V_1Sb_{1.4}Sn_{0.2}Ti_{0.1}Li_{0.1}O_x$-20%$SiO_2$ (Nalco 1060 sol)

Fixed Bed Version

The same procedure as in Example 9 was used to prepare a slurry with all ingredients except silica. The slurry volume just before silica was added was 375 ml, and the solids content was 21.0% weight. Then 91.9 g silica sol (the same ion exchanged and diluted Nalco silica sol used in Example 13) was added with stirring, leaving viscosity low. In about 3 more hours the volume of slurry was reduced to 330 ml by evaporation of water and the solids content reached 29.3% weight. The viscosity was measured by the Brookfield method and found to be 50–70 cps (Spindle No. 2, 20 rpm) much lower than for the comparative catalyst without lithium hydroxide or silica when concentrated to the same extent. After 2.5 more hours evaporation the volume of the slurry was reduced to 260 ml and the solids content reached 34.9% by weight. Viscosity by Brookfield reached 270–290 cps (Spindle No. 2, 20 rpm). After 1 more hour evaporation the volume of the slurry was reduced to 200 ml and the solids content reached 40.5% by weight. Viscosity by Brookfield reached 2600 cps (Spindle No. 4, 20 rpm), but the slurry could still be stirred. Slurry viscosity as a function of solids content was plotted and interpolated values of solids contents at selected viscosities are listed in Table 2. When slurry solids content reached 45.2% and the slurry volume reached 190 ml, stirring was stopped, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

EXAMPLE 16

80% $V_1Sb_{1.4}Sn_{0.2}Ti_{0.1}Li_{0.1}O_x$-20%$SiO_2$ (Nissan Snowtex sol)

Fixed Bed Version

The same procedure as in Example 9 was used to prepare a slurry with all ingredients except silica. The slurry volume just before silica was added was 520 ml, and the solids content was 14.6% weight. Then 66.8 g silica sol (the same Nissan Snowtex silica sol used in Example 11, 30% silicon dioxide) was added with stirring, leaving viscosity low. In about 4 more hours the volume of slurry was reduced to 400 ml by evaporation of water and the solids content reached 24.3% weight. The viscosity was measured by the Brookfield method and found to be 36 cps (Spindle No. 2, 20 rpm) much lower than for the comparative catalyst without lithium hydroxide or silica when concentrated to the same extent. After 5.5 more hours evaporation the volume of the slurry was reduced to 270 ml and the solids content reached 33.9% by weight. Viscosity by Brookfield reached 800 cps (Spindle No. 4, 20 rpm). After 1 more hour evaporation the volume of the slurry was reduced to 230 ml and the solids content reached 38.0% by weight. Viscosity by Brookfield reached 3700 cps (Spindle No. 4, 20 rpm). Slurry viscosity as a function of solids content was plotted and interpolated values of solids contents at selected viscosities are listed in Table 2. Stirring was stopped, and the slurry was dried in an oven for three days at 110° C. After crushing to 6–35 mesh, it was calcined for hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

EXAMPLE 17

90% $V_1Sb_{1.4}Sn_{0.2}Ti_{0.1}Li_{0.1}O_x$-10%$SiO_2$ (Nissan Snowtex sol)

Fixed Bed Version

The same procedure as in Example 9 was used to prepare a slurry with all ingredients except silica. The amounts of all reagents to this point were increased by 9/8 to give the same amount of finished catalyst after silica addition. The slurry volume just before silica was added was 660 ml, and the solids content was 13.3% weight. Then 33.6 g silica sol (the same Nissan Snowtex silica sol used in Example 11, 30% silicon dioxide) was added with stirring, leaving viscosity low. In about 4 more hours the volume of slurry was reduced to 390 ml by evaporation of water and the solids content reached 23.5% weight. The viscosity was measured by the Brookfield method and found to be 38 cps (Spindle No. 2, 20 rpm) much lower than for the comparative catalyst without lithium hydroxide or silica when concentrated to the same extent. After 5 more hours evaporation the volume of the slurry was reduced to 250 ml and the solids content reached 34.0% by weight. Viscosity by Brookfield reached 750 cps (Spindle No. 4, 20 rpm). After 1 more hour evaporation the volume of the slurry was reduced to 225 ml and the solids content reached 36.8% by weight. Viscosity by Brookfield reached 1600 cps (Spindle No. 4, 20 rpm). Slurry viscosity as a function of solids content was plotted and interpolated values of solids contents at selected viscosities are listed in Table 2. Stirring was stopped when solids content reached 37.8% by weight, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

COMPARATIVE EXAMPLE G $V_1Sb_{1.4}Sn_{0.2}Ti_{0.1}Li_{0.2}O_x$

Fixed Bed Version

Hydrogen peroxide, vanadium pentoxide powder, and antimony oxide powder were combined in water to form a slurry as for Example 1. After stirring 20 minutes, 2.49 g titanium dioxide powder (Degussa P-25 Grade) was added to the slurry as it began turning green. The beaker was covered with a watch glass and the mixture was stirred and heated for about 2.5 hours. During this time the slurry gradually turned blackish-grey. 84.58 g of 10.7% tin dioxide sol (Batch No. TX7684, Nalco Chemical Co.) was added to the slurry. After stirring for about 40 more minutes in an uncovered beaker, 127 g 0.47 Molar lithium hydroxide solution was added. Slurry pH rose to near 7, and a grey-white film formed. In about 8 more hours, the volume of the slurry was reduced to 410 ml by evaporation of water and the solids content reached 25.1% weight. The viscosity was measured by the Brookfield method and found to be 40 cps (Spindle No. 2, 20 rpm). After about 4 more hours evaporation the solids content reached 34.7% weight, and the viscosity by Brookfield was 210 cps (Spindle No. 2, 20 rpm). When solids content reached 39.5% weight, the slurry could still be stirred. Stirring was stopped, and the slurry was dried in an oven for three days at 110° C. After crushing to 6–35 mesh, it was calcined for 8 hours at 650° C., cooled and further crushed and sieved to 20–35 mesh. The catalyst was activated by calcining for 3 hours at 810° C. the same as Comparative Example A. However, a portion was washed with 25 ml isobutanol per gram catalyst in 8 stages. The early stages of washing gave positive tests for vanadium leachant, so more isobutanol was used than for other catalysts. While the viscosity is low at high solids contents, as shown in Table 2, propane ammoxidation activity is much higher than for catalysts of the invention but selectivity to acrylonitrile is much lower as shown in Table 4.

COMPARATIVE EXAMPLE H

90% $V_1Sb_{1.4}Sn_{0.2}Ti_{0.1}Li_{0.1}O_x$-10%$SiO_2$ (Aerosil)

Fluid Bed Version

The same procedure as in Example 10 was used to prepare a slurry with all ingredients except silica. The amounts of all reagents to this point were increased by 9/8 to give the same amount of finished catalyst after silica addition. The slurry volume just before silica was added was 1380 ml, and the solids content was 24.4% weight. Next 40.25 g Degussa Aerosil 200 silica powder was added with stirring and water rinses, bringing the slurry volume to 1700 ml. This silica source, unlike silica sols, was not dispersed and stabilized by hydroxide addition prior to mixing with the rest of the catalyst slurry. The volume of slurry was reduced to 1080 ml by evaporation of water and the solids content reached 29.2% weight. The viscosity was measured by the Brookfield method and found to be 350 cps (Spindle No. 4, 20 rpm). The slurry was dried in a portable Niro spray drier to 338 g microspheroidal powder. The yield of chamber product (140 Mesh to pan) which is normally used in fluid bed reactors was 234 g. A portion of that fraction was calcined for 8 hours at 650° C. in a tray in a muffle furnace, and then further activated by calcining for 3 hours at 810° C., before submitting for attrition testing. Catalysts losses by attrition in the Air-Jet Attrition test were 29.0% in the 0–5 hour period and 57.0% in the 5–20 hour period.

COMPARATIVE EXAMPLE I

90% $V_1Sb_{1.4}Sn_{0.2}Ti_{0.1}Li_{0.1}O_x$-10%$SiO_2$ (Aerosil)

Fixed Bed Version

The same procedure as in Example 2 was used to prepare a catalyst slurry without silica. The slurry volume just before the silica addition was 470 ml and the solids content was 20.2% by weight. Then 11.3 g Aerosil 200 silicon dioxide powder was added with stirring and water rinses, bringing the volume to 550 ml and leaving viscosity low. In about 2.5 more hours the volume of the slurry was reduced to 350 ml by evaporation of water and the solids content reached 28.6% by weight. The viscosity was measured by the Brookfield method and found to be 216 cps (Spindle No. 2, 20 rpm). After about 3 more hours evaporation the volume of the slurry was reduced to 250 ml and the solids content reached 37.0% by weight. Viscosity by Brookfield reached 2850 cps (Spindle No. 2, 20 rpm). After about 1.5 more hours evaporation the volume of the slurry was reduced to 210 ml and the solids content reached 43% by weight. Stirring was stopped when solids content reached 37.8% by weight, and the slurry was dried in an oven for three days at 110° C. After crushing to 6–35 mesh, it was calcined for 8 hours at 650° C., cooled and then further crushed and sieved to 20–35 mesh. The catalyst was activated by calcining for 3 hours at 810° C. The catalyst was washed with 18.75 ml isobutanol per gram, the same as Comparative Example A.

Catalyst Testing

Solids Contents of Catalyst Slurries

Solids contents of catalysts slurries were determined by calculation from the total slurry weight and the dry (110° C.) weight of the catalyst obtained from it. The dry weight can be estimated from the quantities of reagents used to make it for small batches or determined by drying a sample for larger ones. Solids contents of samples taken just before drying the catalyst slurries which were spray dried are listed in Table 1, along with their viscosities. The results show that the highest solids contents were reached for catalyst slurries with added lithium hydroxide. The solids contents of smaller batches were determined by direct weighing at intervals during the evaporation of water, and slurry viscosity as a function of solids content was plotted for a number of such batches including one without lithium hydroxide added which is Comparative Example A. Interpolated values of solids contents at selected viscosities taken from these curves are listed in Table 2.

Viscosity at Higher Solids Contents

Viscosity was measured by Brookfield viscometer, and viscometer torque was translated into viscosity using standard tables provided by the manufacturer for the spindles used. Viscosities for catalyst slurries which were to be spray dried were taken just before spray drying and are listed in Table 1. For smaller batches, the solids content was determined at intervals during the evaporation of water, and slurry viscosity was plotted as a function of solids content. Table 2 lists interpolated values of solids contents at selected viscosities. The results show that when lithium hydroxide is not added, the catalyst slurry thickens rapidly as solids contents increase above 20% and becomes too thick to feed to a spray drier.

Attrition Resistance Tests

Attrition resistance of the spray dried catalysts was tested by subjecting them to an Air-Jet Attrition test. Air at a velocity near 890 ft/sec impinges on the catalyst, and fine particles thus generated are separated from the rest by elutriation and collected in a filter assembly which is weighed at intervals. A 50 gram sample of catalyst, originally between 140 and 230 Mesh particle size, is placed in a tube of 1.5 inch internal diameter, 27.5 inches long. Air totaling 15.0 cubic feet per hour is passed into the bottom of the tube through three 0.015 inch diameter holes lined with sapphire. Fines are separated in an upper section of 5 inch internal diameter tubing and pass to a filter made from an extraction thimble which is weighed after flowing air for 5 and 20 hours from the start of the test. Catalyst loss by attrition is calculated from the weight gain in the filter over a specific time interval as a percentage of the total sample weight at the start of the interval.

The results of the attrition resistance tests on spray dried catalysts from Comparative Examples C, D, F, and H, and Examples 3, 7, 10, 11, 12, and 13 are shown in Table 1. The solids content and viscosity of the slurries determined on samples taken just before spray drying are also given in Table 1. Those catalysts without lithium hydroxide added had high attrition losses in both test periods. Catalysts with lithium hydroxide added, but no silica, had low enough viscosities to be fed to the spray drier at solids contents near 30% and had much lower attrition losses.

Adding silica sol, especially Nalco 2327 with 20 nanometer particles, along with lithium hydroxide gave excellent attrition test results, having a 4% loss in the 5–20 hour test period. When Nissan Snowtex silica sol was used along with lithium hydroxide, attrition results were nearly as good at the same level of silica. A catalyst with 20% silica from Nissan Snowtex sol, but without lithium hydroxide added, gives much poorer results in this test, with 48.5% loss in the 5–20 hour test period.

Performance as Propane Ammoxidation Catalysts

Propane ammoxidation performance was determined from the yield of fixed bed flow micro reactor tests using isobutanol washed particles with 20/35 mesh size. The preparation of such fixed bed reactors versions of the catalysts is described in Comparative Examples A, B, D1, E, G, and I, and Examples 1, 2, 3A, 4, 5, 6, 7A, 8, 9, 14, 15, 16, and 17.

To obtain the results near 15% propane conversion shown in Table 3, a 2–6 gram portion of catalyst depending on activity was loaded into a u-tube made from titanium tubing (0.25 inch outside diameter, 0.035 inch wall thickness). The tube was placed in a molten salt bath at 460° C., and a gas with 5 parts propane, 2.9 parts oxygen, 1 part ammonia, and 1 part steam by volume fed to it at a weight hourly space velocity (WWH) with respect to propane as indicated in Table 3. The contact time at 460° C. based on catalyst volume is also shown there. Liquid products, including acrylonitrile (AN) and hydrogen cyanide (HCN), were collected in 0.25 molar oxalic acid and the resulting solution analyzed by vapor phase chromatography. Hydrogen cyanide was determined by a standard argentometric titration. Propane and combustion gases were sampled downstream from the oxalic acid scrubber and analyzed by gas chromatography using a Carle gas analyzer.

To obtain the results near 30% propane conversion shown in Table 4, a similar reactor and charge size could be used in most cases, after increasing the temperature to 480° C. and adjusting the flow rate to achieve the space velocity or contact time indicated in Table 4. A gas with 3 parts propane, 3 parts oxygen, 1.3 parts ammonia, 10 parts nitrogen, and 2 parts steam fed to it at a weight hourly space velocity (WWH) with respect to propane as indicated in Table 4. Otherwise, a larger diameter reactor made from titanium tubing (0.50 inch outside diameter) loaded with 5–10 g catalyst was substituted to achieve the indicated space velocity. Product analysis was conducted similarly to that for runs at 15% propane conversion.

Within the range of lithium hydroxide addition described in the invention, its use does not detract from the high selectivity and activity of these vanadium-antimony oxide catalysts for propane ammoxidation to make acrylonitrile. Acrylonitrile selectivity was near 54% for catalysts without lithium at 30% conversion for runs at one atmosphere. Adding lithium hydroxide, at least Li/V=0.1, without silica, gives similar selectivities. Adding an excess of lithium hydroxide at Li/V=0.2 as in Comparative Example H, outside the range of this invention, makes the catalyst unselective for acrylonitrile.

Catalysts with lithium and Snowtex or Nalco 2327 silica added at the 20% level, as in Examples 9 and 16, have selectivities of 50-53% at 28-30% propane conversion, with the catalyst made from the Snowtex silica giving results at the top of the range as can be seen in Table 4. Selectivity, at one atmosphere, improves, but attrition resistance decreases somewhat when less Snowtex is added. Selectivities are a few points lower for Example 15, the catalyst with 20% Nalco 1060 silica added. Example 14 with only 10% Nalco 1060 silica added gave a catalyst with 54% selectivity.

TABLE 1

Attrition Resistance of Li Modified VSbSnTiO Catalysts Using Air-Jet Test

| Example | Solids wt % | Viscosity | Attrition Test Results | |
|---|---|---|---|---|
| | | | 0-5 hr loss | 5-20 hr loss |
| C | 22.8 | 2400 cps | 52.1% | 41.1% |
| D | 17 | 144 cps | 25.1% | 55.9% |
| 3 | 36 | 2500 cps | 12.9% | 27.9% |
| 7 | 28 | 3200 cps | 12.1% | 32.5% |
| 7* | 28 | 3200 cps | 9.3% | 24.3% |
| 10 | 33 | 700 cps | 2.4% | 3.9% |
| 11 | 35 | 680 cps | 2.7% | 7.2% |
| F | 20 | 22 cps | 55.2% | 48.5% |
| 12 | 32 | 750 cps | 5.2% | 12.0% |
| 13 | 35 | 450 cps | 1.6% | 10.6% |
| H | 29 | 350 cps | 29.0% | 57.0% |

*particle size used 100-140 rather than 140-230 mesh

TABLE 2

Solids Content for Li Modified VSbSnTiO Catalysts

| Example | WT % @ V = 500 cps | WT % @ V = 1000 cps | WT % @ V = 2000 cps | WT % @ V = 5000 cps |
|---|---|---|---|---|
| A | 20.2 | 20.6 | 21.0e | 21.8e |
| 1 | 30.4 | 31.7 | 32.8 | 34.3e |
| 2 | 31.0 | 33.0 | 34.8 | 36.7e |
| 5 | 24.4 | 26.2 | 28.2 | 30.7e |
| 6 | 29.4 | 30.6 | 31.8 | 33.4e |
| 9 | 34.2 | 36.0 | 37.8 | 40.1e |
| 14 | 33.5 | 35.1 | 36.7 | 38.8 |
| 15 | 36.2 | 37.9 | 39.6 | 41.9e |
| 16 | 32.7 | 34.5 | 36.3 | 38.7e |
| 17 | 32.2 | 34.8 | 37.4 | 40.8e |
| G | 38.2 | 40.8e | — | — |

Note: e = extrapolated

TABLE 3

Performance of Li Modified VSbSnTiO Catalysts (1 Atmosphere, Conversions near 15%)

| Example | WWH/c.t. | C₃ Conv | AN Sel | HCN Sel | CO$_x$ Sel | Mat. Bal. |
|---|---|---|---|---|---|---|
| A | 0.45/1.53 | 15.5 | 62.0 | 10.0 | 23.9 | 101.6 |
| D1 | 0.74/1.06 | 14.2 | 60.3 | 9.6 | 24.3 | 99.5 |
| E | 0.56/1.49 | 14.0 | 60.1 | 11.1 | 23.8 | 102.7 |
| 1 | 0.56/1.31 | 14.6 | 61.8 | 10.0 | 23.6 | 97.4 |
| 3a | 0.87/0.76 | 14.4 | 60.4 | 10.7 | 22.6 | 101.6 |
| 4 | 0.41/1.65 | 14.0 | 66.3 | 10.3 | 18.8 | 100.3 |
| 5 | 0.45/1.61 | 14.3 | 61.9 | 9.0 | 24.8 | 99.3 |
| 6 | 0.54/1.37 | 14.0 | 64.2 | 9.6 | 21.5 | 98.5 |
| 6 | 0.50/1.36 | 14.4 | 63.6 | 9.0 | 22.8 | 100.1 |
| 7a | 0.93/0.84 | 15.7 | 59.2 | 10.7 | 25.5 | 96.9 |
| 7a | 0.99/0.74 | 13.8 | 61.6 | 9.6 | 23.2 | 99.1 |
| 8 | 0.40/1.88 | 14.9 | 62.8 | 10.6 | 22.6 | 99.9 |

TABLE 4

Performance of Li Modified VSbSnTiO Catalysts (1 Atmosphere, Conversions near 30%)

| Example | WWH/c.t. | C₃ Conv | AN Sel | HCN Sel | CO$_x$ Sel | Mat. Bal. |
|---|---|---|---|---|---|---|
| B | 0.096/2.17 | 29.7 | 54.7 | 9.7 | 32.6 | 103.8 |
| B | 0.098/2.17 | 30.1 | 54.8 | 11.1 | 31.6 | 98.2 |
| 2 | 0.111/1.62 | 28.3 | 54.7 | 8.5 | 34.6 | 96.8 |
| 2 | 0.111/1.54 | 24.6 | 56.8 | 8.7 | 31.6 | 97.0 |
| 9 | 0.218/1.31 | 29.0 | 52.6 | 10.0 | 34.8 | 98.7 |
| 9 | 0.073/3.22 | 29.9 | 50.2 | 11.3 | 35.4 | 96.9 |
| 14 | 0.137/1.65 | 30.1 | 54.4 | 10.2 | 33.0 | 99.9 |
| 15 | 0.096/2.78 | 25.8 | 48.0 | 10.2 | 40.1 | 99.3 |
| 15 | 0.096/2.78 | 25.6 | 49.7 | 9.9 | 38.4 | 98.0 |
| 16 | 0.200/1.46 | 30.3 | 53.5 | 10.4 | 32.8 | 98.7 |
| 16 | 0.062/4.22 | 28.3 | 52.2 | 11.5 | 33.8 | 99.3 |
| 17 | 0.124/1.83 | 29.5 | 54.9 | 6.2 | 35.5 | 100.0 |
| G | 1.19/0.14 | 25.4 | 8.5 | 7.8 | 50.4 | 99.3 |
| I | 0.125/2.17 | 27.7 | 50.4 | 10.7 | 37.1 | 91.1 |

From the test results, it is shown that the addition of a lithium compound which upon contact with the aqueous catalyst slurry provides hydroxide ions significantly improves attrition resistance of these catalysts and still gives catalysts with sufficient selectivity for ammoxidation to make them commercially useful, when the amount of lithium stays within the specified range. Although the invention has been described in detail through the proceeding examples, these examples are for the purpose of illustration only, and it is understood that variation and modifications can be made by one skilled in the art without departing from the spirit and scope of the invention.

What we claim is:

1. A process for preparing an attrition resistant vanadium-antimony oxide catalyst, comprising the steps of:
    a) preparing an aqueous catalyst slurry comprising vanadium oxide and antimony oxide;
    b) adding a lithium compound to the aqueous catalyst slurry which upon contact with the aqueous catalyst slurry provides hydroxide ions to the catalyst slurry
    c) concentrating the catalyst slurry to increase the solids content of the catalyst slurry; and
    d) drying the catalyst slurry to form attrition resistant particles of vanadium-antimony oxide catalyst.

2. The process for preparing an attrition resistant catalyst wherein the lithium compound added to the catalyst slurry is lithium hydroxide.

3. The process for preparing an attrition resistant vanadium-antimony oxide catalyst of claim 2, wherein the attrition resistant catalysts have the elements and proportions indicated by empirical formula:

$$VSb_mLi_nA_aD_dO_x$$

where A is selected from the group consisting of titanium, tin and combinations thereof; D is selected from the group consisting of magnesium, calcium, strontium, barium, cobalt, nickel, zinc, germanium, niobium, zirconium, molybdenum, tungsten, copper, tellurium, tantalum, selenium, bismuth, cerium, indium, arsenic, boron, manganese, sodium, iron, chromium, gallium, phosphorus, and combinations thereof; m is 0.5 to 10; n is 0.005 to 0.15; a is 0 to 10; d is 0 to 10; and x is determined by the oxidation state of the cations present and the catalysts have been heated at a calcination temperature of at least 780° C.

4. The process for preparing an attrition resistant vanadium-antimony oxide catalyst of claim 3, wherein the calcination temperature is in the range of 790°–1050° C.

5. The process for preparing an attrition resistant vanadium-antimony oxide catalyst of claim 2, wherein lithium salt is added with the lithium hydroxide to the catalyst slurry.

6. The process for preparing an attrition resistant vanadium-antimony oxide catalyst of claim 2, wherein the catalyst slurry is prepared by reacting hydrogen peroxide in aqueous solution with a vanadium compound to form a monoperoxovanadium ion and reacting the monoperoxovanadium ion so formed with antimony trioxide to form a vanadium oxide and antimony oxide catalyst slurry.

7. The process for preparing an attrition resistant vanadium-antimony oxide catalyst of claim 6, wherein the catalyst slurry contains excess antimony oxide in various oxidation states.

8. The process for preparing an attrition resistant vanadium-antimony oxide catalyst of claim 6, wherein the amount of lithium hydroxide added is determined by the hydroxide adsorption capacity of the catalyst slurry.

9. The process for preparing an attrition resistant vanadium-antimony oxide catalyst of claim 1, wherein the lithium content of the catalysts is 0.005 to 0.15 relative to the vanadium content of the catalyst.

10. The process for preparing an attrition resistant vanadium-antimony oxide catalyst of claim 2, wherein the amount of lithium hydroxide added is 0.1 to 3 micromoles per square meter of vanadium and antimony oxide particles in the catalyst slurry.

11. The process for preparing an attrition resistant vanadium-antimony oxide catalyst of claim 2, wherein the catalyst slurry is concentrated by removing water from the catalyst slurry.

12. The process for preparing an attrition resistant vanadium-antimony oxide catalyst of claim 11, wherein water is removed from the catalyst slurry before the lithium hydroxide is added.

13. The process for preparing an attrition resistant vanadium-antimony oxide catalyst of claim 11, wherein water is removed from the catalyst slurry after the lithium hydroxide is added.

14. The process for preparing an attrition resistant vanadium-antimony oxide catalyst of claim 2, wherein the catalyst slurry is dried by spray drying.

15. The process for preparing an attrition resistant vanadium-antimony oxide catalyst of claim 2, wherein the catalyst slurry is dried by heating to at least 110° C. in an oven.

16. The process for preparing an attrition resistant vanadium-antimony oxide catalyst of claim 2, wherein the catalyst are supported by a carrier.

17. The process for preparing an attrition resistant vanadium-antimony oxide catalyst of claim 2, wherein the catalysts contain silica.

18. The process for preparing an attrition resistant vanadium-antimony oxide catalyst of claim 17, wherein the silica is silica sol.

19. The process for preparing an attrition resistant vanadium-antimony oxide catalyst of claim 18, wherein the particle size of the silica sol is in the range of 5 to 100 nanometers.

20. The process for preparing an attrition resistant vanadium-antimony oxide catalyst of claim 18, wherein the silica sol is added to the catalyst slurry before the lithium hydroxide is added.

21. The process for preparing an attrition resistant vanadium-antimony oxide catalyst of claim 18, wherein the silica sol is added to the catalyst slurry after the lithium hydroxide is added.

22. The process for preparing an attrition resistant vanadium-antimony oxide catalyst of claim 18, wherein part of the lithium added to the catalyst slurry is in the form of lithium exchanged silica sol with excess lithium hydroxide.

23. An attrition resistant vanadium-antimony oxide catalyst made by the process of claim 2, wherein the catalyst has the elements and proportions indicated by empirical formula:

$$VSb_mLi_nA_aD_dO_x$$

where A is selected from the group consisting of titanium, tin and combinations thereof; D is selected from the group consisting of magnesium, calcium, strontium, barium, cobalt, nickel, zinc, germanium, niobium, zirconium, molybdenum, tungsten, copper, tellurium, tantalum, selenium, bismuth, cerium, indium, arsenic, boron, manganese, sodium, iron, chromium, gallium, phosphorus, and combinations thereof; m is 0.5 to 10; n is 0.005 to 0.15; a is 0 to 10; d is 0 to 10; and x is determined by the oxidation state of the Gations present.

* * * * *